UNITED STATES PATENT OFFICE 3,424,824
Patented Jan. 28, 1969

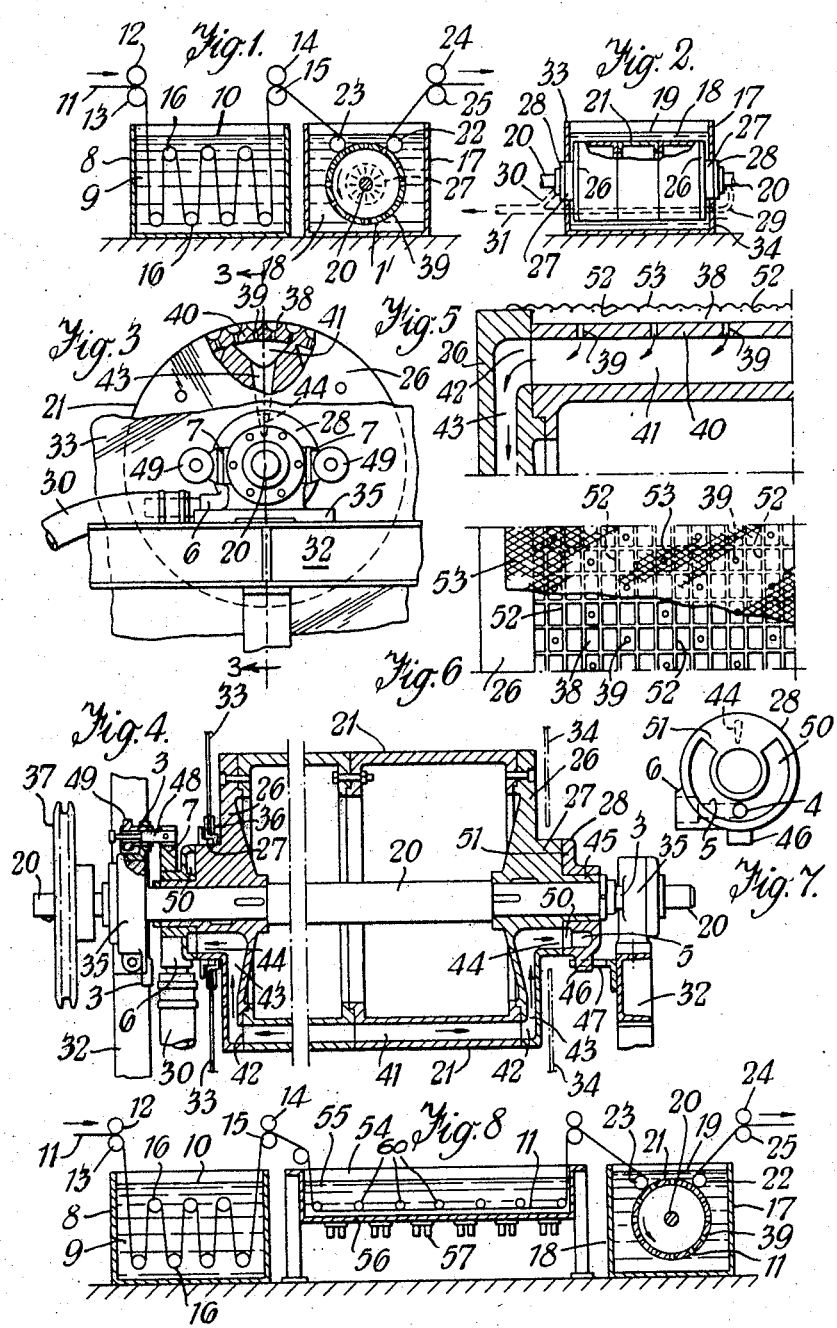

3,424,824
MANUFACTURE OF MICROPOROUS SHEET PLASTIC MATERIAL
Edward H. Harbard, Kirk Ella, and Arthur R. Stephenson, Skidby, England, assignors to T. J. Smith & Nephew Limited, Kingston-upon-Hull, Yorkshire, England
Filed Feb. 8, 1966, Ser. No. 525,997
Claims priority, application Great Britain, Feb. 11, 1965, 5,959/65
U.S. Cl. 264—23          6 Claims
Int. Cl. B29d 27/00

ABSTRACT OF THE DISCLOSURE

A method of manufacturing microporous plastic sheets of the type in which a soluble filler is incorporated in the plastic mix before the same is formed into a sheet. The plastic sheet is fed to a tank containing a leaching liquid for dissolving the filler and a differential pressure is applied to the sheet to remove the soluble filler from the sheet and leave the latter in a microporous condition when withdrawn from the tank.

---

The present invention relates to the manufacture of microporous plastic sheet material of the type in which a soluble filler is incorporated in the plastic mix of the sheet material before the same is cast, extruded or otherwise formed into a sheet. The soluble filler is leached out of the sheet material after the same has been formed by passing the sheet through running water or other suitable leaching liquids which are preferably heated until all of the soluble filler has been removed, thus leaving the material in a microporous state.

One object is to provide a method for quickly and easily removing the soluble filler within a relatively short time period in which the filler is subjected to a differential pressure to forcibly remove substantially all of the filler from the sheet material.

Another object is to provide a method for removing the soluble filler without requiring numerous steps and process stages, thus reducing the labor required in said stages and the floor space consumed by the necessary apparatus in the production of such material according to present-day practice.

According to the present invention the soluble filler is removed or washed out of the sheet by exposing the opposed surfaces of the sheet to differential pressures for a predetermined time period, whereby the water or other liquid (preferably heated) passes through the sheet from one surface to the other. Preferably, one surface of the sheet is subjected to the ambient external pressure, and the other to a reduced pressure as by means of a suitable suction pump or the like.

By this differential pressure method, the material of the sheet is penetrated and passed through by the leaching liquid, almost instantaneously, and not gradually as with heretofore known methods. As a consequence, the soluble filler in the body or thickness of the sheet is more quickly and readily dissolved and displaced to pass away with the leaching liquid in which the sheet is preferably immersed.

A great many constructional forms of the apparatus can be devised to carry the invention into effect, and consequently the invention is not limited to any particular form. However, in order to prevent the surface of the material from becoming scratched by the abrasive action of the soluble material it is necessary that the material be immersed while traveling over a relatively smooth surface such as the periphery of the drum and at substantially the same peripheral speed of the drum to reduce such abrasive action.

In some cases, the apparatus may include as a preliminary or other stage, ordinary leaching out means and have one or more stages operating according to the differential pressure method of the present invention.

In an apparatus according to the invention operating by suction, the plastic sheet material containing a soluble filler to be leached passes from a take-off roll to a leaching tank or the like of suitable dimensions filled to a predetermined level with warm water or other leaching liquid subject to ambient external pressure. Rotatably mounted on a horizontal axis within the tank is a hollow perforated drum or cylinder of increased diameter and is adapted to rotate at a relatively slow peripheral speed. The plastic sheet material nearly completely encircles the drum and moves therewith, and the interior of the drum is in communication with a reduced pressure means such as an exhausting pump.

The leaching liquid in the tank is on the exterior of the drum, which is enwrapped by the sheet material and is simultaneously immersed in the leaching liquid, consequently, the liquid is drawn by the suction created in the perforations of the drum through the thickness of the sheet material thereon, and said material is leached in the process. After passing through the material, the liquid with the soluble filler in a dissolved state is drawn off by the suction or reduced pressure source and a suitable supply of leaching liquid is supplied to the tank to replenish the liquid removed, and thus maintain the level therein at a predetermined height.

In order to spread the suction effort of the reduced pressure source to parts of the sheet material which do not directly cover a perforation or opening in the drum, a thickness or thicknesses of porous fabric, paper or other suitable material is interposed and included between said sheet material and said drum.

Other objects and advantages of the invention will become apparent during the course of the following description of the accompanying drawing, wherein;

FIGURE 1 is a diagrammatic view illustrating a method of carrying the invention into effect.

FIGURE 2 is a vertical cross-sectional view through the tank and drum of FIGURE 1.

FIGURE 3 is an end elevational view partly in section of a hollow perforated suction roller or drum employed in the method of the present invention.

FIGURE 4 is a vertical cross-sectional view taken on line 3—3 of FIGURE 3 and looking in the direction of the arrows showing the manner in which the roller drum is supported and the ducts communicating with the interior of the roller.

FIGURE 5 is an enlarged fragmentary cross-sectional view illustrating structural features of the rotary drum or roller.

FIGURE 6 is a plan view of the roller shown in FIGURE 5 illustrating portions of the perforated surface thereof.

FIGURE 7 is an end elevational view showing structural details illustrated in FIGURES 3 and 4, and FIGURE 8 is a diagrammatic view silimar to FIGURE 1 but showing an additional intermediate leaching stage.

In the drawing, and more in detail, attention is first directed to FIGURES 1 and 2 wherein there is shown a tank 8 for containing a leaching liquid 9 such as warm or hot water, which is supplied at a desired rate from a warm water source. The dissolved leached out soluble material is withdrawn at the same rate, to maintain a more or less constant liquid level 10.

The plastic sheet material 11 in which the fine particle soluble filler is incorporated and which filler is to be leached out of the material to leave it as a microporous plastic material is drawn from a bulk supply roller (not shown) by driving rollers 12, 13 and 14, 15 and passes into the tank 8 around a series of guide rollers 16 disposed at two levels below the liquid level 10, so that the sheet material travels along a zig-zag up and down pathway. Any or all of the guide rollers 16 may be driven. The plastic sheet material in the tank 8 is subjected to a preliminary leaching stage in which a proportion of the soluble material, such as sodium silicate or common salt is leached from the film, which proportion depends on a number of factors to be hereinafter referred to.

A second tank 17 also containing warm or hot water which is maintained at a constant liquid level by a suitable supply from a liquid source to compensate for the liquid charged with the soluble leached out material, which is drawn off by the reduced pressure means or suction pump to be described.

Rotatably mounted to extend through the tank 17 from the front to the back (FIGURE 2) is a horizontal driven shaft 20 having secured thereto a hollow roller 21 which rotates with said shaft and is provided with a perforated peripheral wall 21.

At its upper portion on each side of the central plane, the hollow roller is engaged by cooperating horizontal guide rollers 22 and 23 which are in light contactual engagement therewith, and the material 11 from the driving rollers 14, 15 passes between the rollers 23 and the hollow perforated roller 21 to partially encircle the roller 21 and then passes partly around the guide roller 22 and between additional driving rollers 24 and 25.

While traveling around the perforated roller 21, the plastic material is subjected to a defined suction which exerts a reduced pressure through the perforations 39 in the roller 21 from a continuous reduced pressure source or suction pump (not shown).

Attention is now directed to FIGURES 3 to 6 inclusive, wherein the invention is more particularly described and as shown, the perforated hollow roller 21 is provided with opposed end plates 26 suitably secured to the roller 21, and said plates are provided with bearing bosses 27 mounted to rotate in suitable bearings in the front and back walls of the tank 17. The bosses 27 about fixed non-rotating collars 28 mounted on the shaft 20, which are provided with interior segmental passages. The passages communicate to the side plates and are connected with the suction perforations in the roller 21, and on the other hand are connected by conduits 29 and 30 to a main suction pipe 31 to a reduced pressure source such as a suction pump (not shown).

As a result, the plastic material is immersed in the tank 17 as it passes along the surface of the roller and the leaching liquid is caused to pass through said material by the suction pull exerted thereon and in such a manner that the plastic sheet material which passes through the driving rollers 24 and 25 is entirely freed from the soluble material, that is to say, it has been fully leached and constitutes microporous sheet material having a series of minute voids or passages.

The framework of the apparatus 32 as shown in FIGURES 3 to 6 and illustrated at the front 33 and back 34 of the tank 17 (FIGURE 2) carries, outside the tank, a bearing for the shaft 20 to which the side plates 26 of the roller within the tank are keyed. These side plates 26 have their bosses 27 rotatably mounted in packed glands in the front and back 33 and 34 of the tank; one of the glands 36, is indicated at the left hand side of FIGURE 4, and a similar gland is provided for the other side. The driving shaft 20 is provided at one end with a driving sprocket wheel 37 adapted to be driven by a suitable motor (not shown).

The perforated hollow roller 21 is constructed from three similar sections, bolted together as indicated in FIGURE 1 and shown in FIGURE 4 by suitable fastening elements passing through correspondingly aligned bores of internal flanges. As indicated in FIGURE 3, the external surface of the roller 21 is formed with a plurality of similar semicircular sectional channels 38 which extend parallel to the axis and open at their ends into each conduit 41, and which open the inner ends of the perforations 39 of four rows of perforations in four channels 38, as will be appreciated from viewing FIGURE 3. It will thus be seen, that the channels or recesses 38 extend in rows parallel to the axis of the drum and thus form a series of circumferential rows of channels extending over the entire peripheral area of the drum not including the plates 26.

It will thus be seen, that as the plastic sheet material travels with and around the roller, it is immersed in the tank 17 so that the leaching liquid will pass through the material by the suction force exerted on the dissolved material in such a manner that the plastic material will be entirely free from the soluble material.

At the point where the side plates 26 join the ends of the roller at the positions of the open ends of the conduits 41, suitable ports 42 are provided in the inner surfaces of the side plates and said ports open into radial conduits 43, each of which opens into a port 44 at its inner end in the face of the boss 27. Hence, if suction is exerted at the ports 44 of the bosses 27, suction is created through all the perforations 39 and the suction force is uniformly distributed and acts throughout the lengths of the axially extending channels 38 on the surface of the roller 21.

The non-rotary fixed collars 28, one of which is shown detached in FIGURE 7, and as seen in FIGURE 4, is mounted on extensions 45 of the boss 27. There are two such collars 28, and as shown on the right hand side of FIGURE 4, they are prevented from rotating by an integral projection 46 which is received in a forked bracket member 47 affixed to the framework 32 of the machine.

The fixed collars 28 are of the same outer diameter as their bosses 27, and their inner faces abut and operate in running contactual engagement with the outer faces of the bosses. They are applied to the surface of the boss in an adjustable liquid tight manner by means of spring pressed pins. One of the pins 48 is shown in FIGURE 4, and has a screwed cap 49 adjustably mounted in an internally screw threaded lug 3 integral with the bearing 35.

Each fixed collar 28 is provided with fixed arms 7 (FIGURE 4) arranged in diametrically opposed relation for accommodating a pin such as the spring pressed pin 48. However, for the sake of clarity, only one such arm is shown on the left hand side of FIGURE 4 (which left hand side is in plan).

A pair of arms 7 and caps 49 appear in FIGURE 3. The right hand portion of FIGURE 4 is in sectional elevation and here the bearing 35 shows only one of the internally screwed lugs 3 on this side of the machine. Each collar 28 has a segmental passage 50 (part of an annular passage), the ends of the segment being spaced by a solid blocking or obturating portion 51. The suction conduits 29 and 30 are connected to the segmental passages 50 (the conduit 30 showing in FIGURE 4) and communicate with the ports 44 (one of which is indicated in FIGURES 3 and 7). Thus, the ports 44 move in a circular path about the axis of the shaft 20 so that they open into the segmental passages 41 in all positions of rotation except when they pass through the upper portion of their circumferential travel where they are blocked or closed by the blocking or obturating portion 51. Thus, the suction creating source is in constant communication with the ducts 41 throughout the rotary travel of the roller or drum, except the upper peripheral portion of the drum between the drive rollers 22 and 23, and hence, the liquid 18 in the tank 17 is not drawn through the apertures 39.

In FIGURE 7 there is shown a socket 6 for the connection of either conduit 29 or 30, and the socket is provided with an opening or passageway 5 extending to the port 4 which is in communication with the arcuate or segmental passage 50.

The blocking or obturating portions 51 are so positioned that they cut off the suction from certain radial passages 43 from the particular port 42, as well as the perforations 39 and the circular grooves 38 associated therewith during the passage of the roller through the gap between the guide rollers 22 and 23, so that when the roller is positioned between the gap which is not covered by the material being treated no suction effort will be wasted.

The construction of the hollow perforated roller 21 is completed by notching the outer edges of the limbs between adjacent semi-circular section channels 38, and helically winding on the outer surface of the roller, to engage these notches, a wire 52 to form a guard. Over this guard is disposed a porous cover 53 of suitable material, which may be a suitable textile or fabric, for example so-called Terry toweling. This wire guard and porous cover not only prevent the relatively thin and flexible sheet material from being drawn down into the channels 38, but act to uniformly distribute the suction from the perforations 39 so that said suction is applied uniformly over the whole area of the material under treatment.

In operation, the plastic sheet material 11 is fed to the tank 8 and passes around the guide rollers 16 along a sinuous pathway. The plastic sheet material is withdrawn from the tank 8 and fed to the tank 17 where it is immersed in the liquid 18 and travels in a circuitous path around the drum 21. The motor (not shown) is started to rotate the sprocket wheel 37 and the drum 21 at substantially the same speed as the feed of the sheet material 11 so that the mutually engaging surfaces of the roller 21 and plastic sheet material 11 will not be subjected to an abrasive action, and also to maintain the sheet against relative movement with respect to the drum so that the apertures therein will uniformly withdraw the soluble material incorporated in the plastic sheet material.

Simultaneously, the fluid suction pump is operated to create a reduced pressure in the circumferentially spaced longitudinally extending ducts 41 in the drum 21 so that liquid from the tank will be withdrawn through the plastic material, perforations 39, duct 41 and at the passages 42 in the end plates 26. The fluid flow is then inwardly and radially through the ducts 43 to the outlet ducts 44. The outlet ducts 44 communicate with the annular channel 50 in the fixed end plates 28, and the flow is then through the ducts 5 in the bosses 6 of the end plates 28 to the outlet or discharge ducts 29 and 30 and thence to the intake of the exhaust or suction pump. The end plates 28 are yieldingly urged into engagement with the hub portions 27 of the end walls 26 by means of yielding spring plungers 48 supported by the projections 7 on the bearing 35 and adapted to be adjusted by suitable screw threaded adjustment members 49.

Thus, it will be seen, that when the drum 21 is rotating reduced pressure will be exerted on the plastic sheet material throughout its travel around the drum, with the exception of the upper periphery during the drum travel between the rollers 22 and 23. During this period suction is cut off from the ducts 41 in this area by the segmental portion 51 of the pressure plates 28, and hence the longitudinal ducts 41 of the drum are not subjected to reduced pressure during their travel between the spaced rollers 22 and 23.

In an example of carrying the invention into effect employing an apparatus as illustrated in FIGURES 1 to 6, the plastic sheet material 11 which can be formed of any suitable synthetic plastic composition, but in the present example a polyvinyl chloride film 48" wide and of a thickness within the range of 0.0095 to 0.011" is used with a filler of sodium chloride such as ordinary common table salt incorporated therein. The sheet material above selected was introduced into the pre-leaching tank 8 supplied with warm water at a temperature of 80° C. and the water was circulated while the sheet was passing through the tank at a rate of speed of 12 feet per minute.

The above step partially leached and dissolved portions of the salt, and the plastic sheet material was then introduced into the suction tank 17 around a driven suction roller 21 having a diameter of 27" and constructed in a manner as shown in FIGURES 3 to 6 inclusive. The film and roller or plastic sheet was immersed in warm water at a temperature of 80° C., while the roller was rotated at the rate of 1¾ revolutions per minute so that the plastic sheet film during its travel through the circuitous pathway was subjected to a continuous suction or reduced pressure for 0.5 of a minute, and was delivered by the rollers 24 and 25 and removed from the tank in a completely leached out condition as a microporous polyvinyl chloride film.

It should be noted that the efficiency of the leaching is dependent mainly on the temperature, circulation rate and salt concentration of the water, the degree of tension and stretch to which the film is subjected, the period of time under suction, and the degree of suction.

The periods of time which the film requires in each of the tanks is dependent on the above variables, but the main controlling variable is the period of time the film is under suction.

For example, for a time of 30 seconds under suction of 6 inches of mercury vacuum, a pre-leach time of 4 minutes is required, while for 15 seconds under suction a pre-leach time of 6 minutes is necessary. The length of the material in the preliminary leaching tank 8 thus must vary directly with the time of treatment in said tank.

Specifically regarding the suction tank and suction effort, under test the variables previously mentioned have been shown to considerably effect the rate at which salt is removed from the film, and the following relationships have been established:

(1) Salt removal rate increases with increase in temperature of the water.
(2) Salt removal rate increases as the time period under suction increases.
(3) Salt removal rate increases as suction increases provided boiling does not occur (due to the lowering of the pressure).
(4) Salt removal rate increases as film tension increases.

The modified form of the invention diagrammatically illustrated in FIGURE 8 shows a preliminary leaching tank 8, a suction tank 17 similar to those shown in FIGURE 1, and the various parts are represented by identical reference numerals. An additional leaching tank 54 is positioned between the tanks 8 and 17. The tank 54 is supported on suitable supporting legs and is provided with a series of immersion rollers 60 located adjacent the bottom wall 56 of the tank 54.

The material from the pre-leaching tank 8 is introduced into the tank 54 which contains a quantity of leaching liquid or the like having a predetermined liquid level above the rollers 60. While passing along the bottom wall area of the tank the plastic sheet material with the incorporated soluble material is subjected to ultrasonic vibration in the manner set forth and claimed in our co-pending application, where the plastic sheet material 11 is immersed in the leading liquid and travels through the tank 54 in closely spaced relation from the bottom wall 56 thereof, which is provided with a series of ultrasonic transducers 57 affixed to its underside. The transducers are included in an appropriate generating current which, when energized, causes ultrasonic vibrations to be transmitted through the water, the power input being at least sufficient for the onset of cavitation.

In a second example of carrying the invention into effect employing the apparatus as shown in FIGURE 8, a similar polyvinyl chloride sheet film to that used in the first example herein given, demonstrated that the combination of ultrasonic and suction leaching steps enabled the soluble material to be more quickly leached out of the film or plastic sheet than when using suction alone. The marked increase in rapidity with which the soluble material or salt was removed and the completeness of such removal indicated that the vibration and suction steps enhanced the invention, and the production rate of microporous void containing synthetic plastic sheet material.

It was shown that, with a preliminary leaching time of 2 minutes, an ultrasonic leaching time of 15 seconds, and a suction time of 30 seconds, the material was completely leached out. That is to say, the leaching was completed in a total time of 2 minutes 45 seconds as compared with 4 minutes 30 seconds for the first example given, and approximately 20 minutes which would be necessary by the known conventional leaching methods.

In some cases the leaching need not be completed in one suction stage, but the material passed, after such stage, to another suction stage. Thus, with a perforated roller apparatus as set out above, after moving with and passing around one perforated roller, the said material could then proceed to a second perforated roller in a cyclic fashion.

A multi-hollow-cylinder apparatus could have the cylinders of relatively small diameter, each cylinder having perforations therein and the hollow interiors being in connection with a suction source to operate on the liquid. Some of the cylinders could come at one level, and other cylinders at another level, and their axial distance apart could be such that the sheet material could wrap round each cylinder at a desired angle, preferably over two right angles, and so be passed around and between the rollers that first one surface came on the exterior and then the other surface, and so on throughout the whole series of upper and lower cylinders.

The invention is not limited to the precise forms or details herein set forth, as these may be varied to suit particular requirements.

Other granulations of the alkali metals beside sodium chloride can be used in forming the synthetic plastic sheet material as long as the granulation size is within the operational limits of the sheet thickness indicated above. Also, other soluble compounds can be employed in which the granular size is similar to the operational limits indicated above such as sugar and the like.

What we claim is:

1. In a method of manufacturing microporous plastic sheets of the type in which a soluble filler is incorporated in a plastic mix before the same is formed into a sheet, the steps comprising feeding said plastic sheet to a leaching tank containing a liquid for dissolving said filler, exposing the opposed surfaces of the sheet for a period of time to differential pressure while in said tank to completely dissolve and remove the soluble filler from said sheet and leave the plastic sheet in a microporous condition, and withdrawing said sheet from said tank.

2. A method as set forth in claim 1, in which one side of the sheet is subjected to a reduced pressure.

3. A method as set forth in claim 1, including the steps of continuously feeding the sheet to said immersion tank, continuously circulating a leaching liquid through said tank to maintain the liquid level in said tank, and subjecting one surface of said sheet to reduced pressure while immersed in the liquid.

4. A method of manufacturing microporous plastic sheets, consisting of the steps of feeding the sheet material to a tank containing a leaching liquid for dissolving soluble material incorporated in said sheet material, moving said sheet material with a cylindrical surface having air passageways while in said tank, subjecting said sheet material to reduced pressure exerted within said cylindrical surface to draw the leaching liquid through the sheet material while the same is being moved with said cylindrical surface, and simultaneously removing the liquid with the dissolved soluble material in solution from the tank.

5. A method as set forth in claim 1, in which the material to be leached is subjected to a preliminary leaching action before being fed to the immersion tank.

6. A method as set forth in claim 5, in which the microporous plastic sheet material is subjected to the action of ultrasonic vibration and leaching for a period of time during its passage from the preliminary leaching step to the step in which the sheet material is fed to the immersion tank.

References Cited

UNITED STATES PATENTS

| | | | |
|---|---|---|---|
| 1,275,216 | 8/1918 | Cady | 118—419 |
| 1,728,471 | 9/1929 | Bratring. | |
| 2,423,780 | 7/1947 | Kollenberg et al. | 117—119 XR |
| 2,670,500 | 3/1954 | Ensslin et al. | 264—49 |
| 2,800,682 | 7/1957 | Dooley. | |
| 2,984,869 | 5/1961 | Honey et al. | 264—49 |
| 3,066,084 | 11/1962 | Osterman et al. | 134—15 XR |
| 3,111,454 | 11/1963 | Tucker et al. | 162—321 XR |
| 3,132,194 | 5/1964 | Edmonds et al. | 264—49 XR |

FOREIGN PATENTS

| | | |
|---|---|---|
| 241,489 | 11/1962 | Australia. |
| 561,656 | 8/1958 | Canada. |

JULIUS FROME, *Primary Examiner.*

PHILIP E. ANDERSON, *Assistant Examiner.*

U.S. Cl. X.R.

264—49, 88, 101